Jan. 4, 1938.   J. R. BURCHAM   2,104,636
ADVERTISING DEVICE
Filed Aug. 27, 1937   2 Sheets-Sheet 1

James R. Burcham, INVENTOR
BY Victor J. Evans & Co.
ATTORNEYS

Jan. 4, 1938.　　　J. R. BURCHAM　　　2,104,636
ADVERTISING DEVICE
Filed Aug. 27, 1937　　　2 Sheets-Sheet 2

James R. Burcham
INVENTOR
BY Victor J. Evans & Co.
ATTORNEYS

Patented Jan. 4, 1938

2,104,636

UNITED STATES PATENT OFFICE 2,104,636

ADVERTISING DEVICE

James Russell Burcham, Newcastle, Ind.

Application August 27, 1937, Serial No. 161,326

3 Claims. (Cl. 40—28)

My invention relates to advertising devices and has for one of its primary objects the provision of a device in the form of a sphere adapted for rotation over a desired course and equipped with means for maintaining a simulated source of power on the outer face thereof at all times during the operation of the device.

Other objects and advantages will be apparent from the following description, appended claims and annexed drawings.

Referring to the drawings wherein like reference characters designate like parts throughout the several views.

Figure 1:
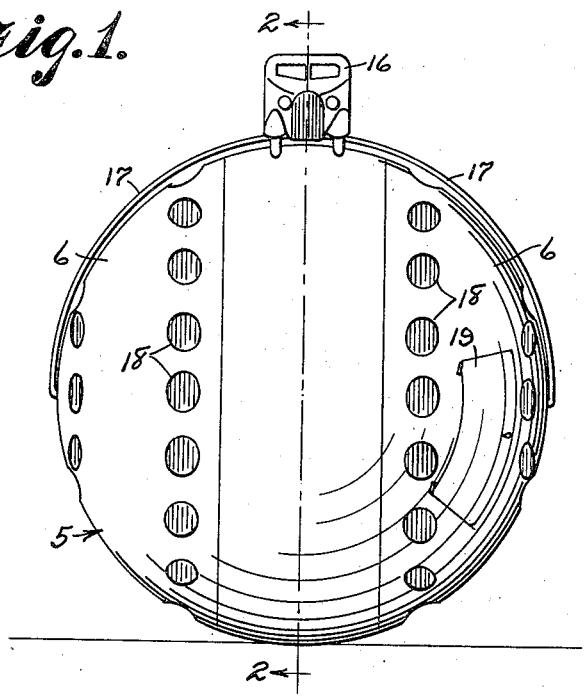
Figure 1 is a front elevation of my invention.
Figure 2:
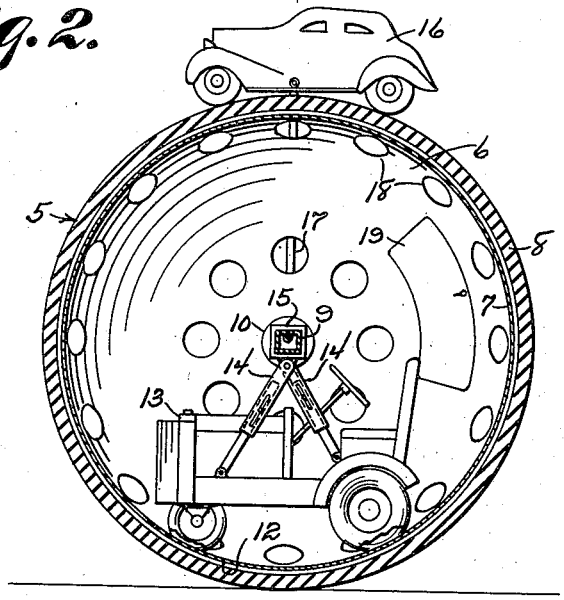
Figure 2 is a sectional view taken on the line 2—2 of Figure 1.
Figure 3:
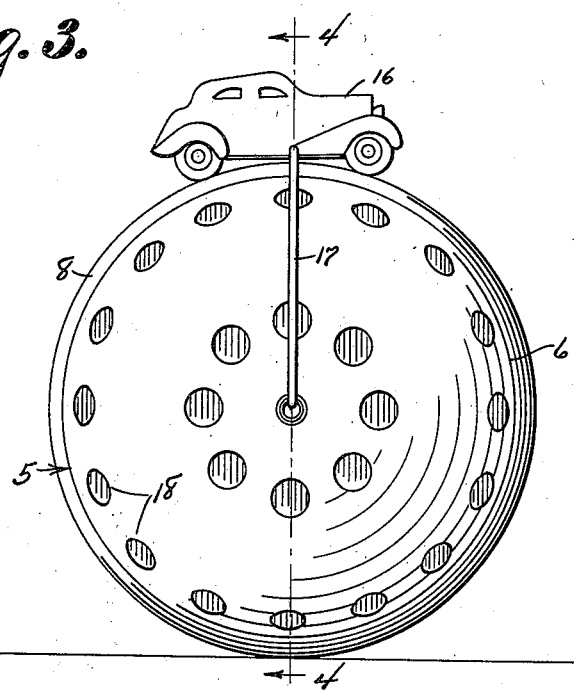
Figure 3 is a side elevation of the invention.
Figure 4:
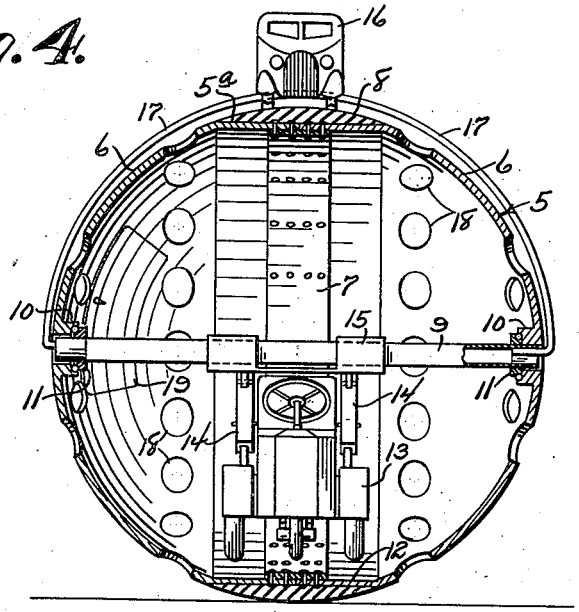
Figure 4 is a sectional view taken on the line 4—4 of Figure 3.

In practicing my invention I employ a hollow body in the form of a sphere 5, preferably formed of sheet metal, fashioned with connected side sections 6. The side sections 6 are connected together on the inner faces thereof by a circumferentially extending band 7, suitable rivets being employed to connect the sections to said band. The outer surface of the body adjacent the jointure of the side sections is formed with a circumferentially extending plane surface 5a and receives thereon a tire 8 having a tread conforming to the general contour of said body.

Extending coaxially with the horizontal axis of the body is a shaft 9 having ends journaled for rotation in bearings 10 formed on the interior face of the body, suitable ball bearings 11 being employed to effect easy rotation of the body relative to the shaft.

The plane surface 5a defines a track 12 on the inner periphery of the body for engagement with the drive wheels of a three-wheeled tractor 13. The tractor 13 is provided on both sides thereof with telescoping sleeve members 14 pivoted together at the top ends thereof to a bracket 15 mounted on the shaft 9. The shaft 9 is of hollow construction and of a square configuration in cross section for engagement with a similar shaped bore formed in the bracket 15. The sleeve members 14 function to permit engagement of the tractor wheels with the track 12 at all times and to maintain the shaft 9 in connected relationship with the tractor to prevent rotating movement between said shaft and said tractor.

Secured on the outer circumference of the body and in tracking engagement with the tread of the tire 8 is a simulated source of power in the form of an automobile 16. Said automobile is maintained in horizontal relationship with the tractor 13 by means of laterally extending arms 17, the upper ends of the arms being secured to the automobile and the lower ends secured within the shaft 9 above the horizontal axis thereof.

The body is formed with a plurality of windows 18 whereby the operator of the tractor is enabled to view the desired line of travel. Suitable doors 19 are provided in the sides of the body to permit entrance therein.

From the foregoing, it will be apparent that upon operation of the tractor, the same will rotate the body about the shaft 9 through the medium of the driving wheels engaging the track 12 and at the same time the automobile 16 will be maintained in horizontal relationship with the tractor through the medium of the arms 17 connecting the same to the shaft 9.

The device when operated presents an attractive and novel appearance and suitable advertising indicia may be secured on the sides thereof or an appropriate device substituted for the automobile 16.

The revolving of the body imparts a rotating movement to the wheels of the automobile 16 and thereby simulates the effect of an automobile operating a sphere, the tractor being concealed from view within the body. The body, during the course of travel, may be guided in various directions by operation of the guide wheel of the tractor which engages the track 12.

In assembling the device, the tractor is positioned within one of the sections of the body, the other section is then connected thereto and the various parts including the tractor adjusted together in operating relationship.

While I have shown and described my invention as lending itself to advertising purposes, it is to be distinctly understood that the same may be adapted for amusement and like purposes without departing from the spirit of the invention or scope of the appended claims.

What is claimed is:

1. A device of the character described, comprising, a spherical body, a shaft within said body extending coaxially with the horizontal axis of said body, bearings connecting said shaft to said body whereby to permit said body to rotate relative to said shaft, a source of power connected to said shaft and engaging the inner periphery of said body to rotate the same and equipped with means engaging said periphery whereby to steer the same, and a simulated source of power engaging the outer periphery of said body and maintained in horizontal relationship with said first source of power whereby to simulate the appearance of rotating said body.

2. A device of the character described, comprising, a spherical body, a shaft within said body extending coaxially with the horizontal axis of said body, bearings connecting said shaft to said body whereby to permit said body to rotate relative to said shaft, a track formed on the inner periphery of said body, a source of power connected to said shaft and engaging said track in a manner to rotate said body and equipped with means engaging said track whereby to guide said body, and a simulated source of power engaging the outer periphery of said body and maintained in horizontal relationship with said first source of power whereby to simulate the appearance of rotating said body.

3. A device of the character described, comprising, a spherical body, a shaft within said body extending coaxially with the horizontal axis of said body, bearings connecting said shaft to said body whereby to permit said body to rotate relative to said shaft, a track formed on the inner periphery of said body, a source of power connected to said shaft and engaging said track in a manner to rotate said body and equipped with means engaging said track whereby to guide said body, a tire formed on the outer periphery of said body, and a simulated source of power engaging said tire and maintained in horizontal relationship with said first source of power whereby to simulate the appearance of rotating said body.

JAMES R. BURCHAM.